United States Patent
Berthier

(10) Patent No.: US 12,546,385 B2
(45) Date of Patent: Feb. 10, 2026

(54) BALL SCREW MECHANISM WITH ASYMMETRICAL ANGULAR THREADS

(71) Applicant: NTN EUROPE, Annecy (FR)

(72) Inventor: Julien Berthier, Saint-Jorioz (FR)

(73) Assignee: NTN EUROPE, Annecy (FR)

( * ) Notice: Subject to any disclaimer, the term of this patent is extended or adjusted under 35 U.S.C. 154(b) by 0 days.

(21) Appl. No.: 19/050,354

(22) Filed: Feb. 11, 2025

(65) Prior Publication Data
US 2025/0257795 A1    Aug. 14, 2025

(30) Foreign Application Priority Data

Feb. 13, 2024   (FR) ..................... 2401384

(51) Int. Cl.
*F16H 25/24*    (2006.01)
*F16H 25/22*    (2006.01)

(52) U.S. Cl.
CPC ......... *F16H 25/24* (2013.01); *F16H 25/2204* (2013.01); *F16H 25/2214* (2013.01)

(58) Field of Classification Search
CPC ...... F16H 25/22; F16H 25/24; F16H 25/2214; F16H 25/2204
See application file for complete search history.

(56) References Cited

U.S. PATENT DOCUMENTS

| | | | |
|---|---|---|---|
| 6,334,370 B1 | 1/2002 | Sonoda et al. | |
| 6,926,515 B2 * | 8/2005 | Wohlrab | B29C 45/66 |
| | | | 425/451.9 |
| 9,267,588 B2 * | 2/2016 | Buvril | F16H 25/2252 |

FOREIGN PATENT DOCUMENTS

DE    102007017214 A1    10/2008

OTHER PUBLICATIONS

Search Report mailed Sep. 3, 2024, in connection with French Patent Application No. 2401384, 20 pgs. (including translation).

\* cited by examiner

*Primary Examiner* — Jake Cook
(74) *Attorney, Agent, or Firm* — Chiesa Shahinian & Giantomasi PC

(57) ABSTRACT

A ball screw mechanism, including a screw defining a reference axis, a nut and at least two balls positioned to roll on a screw thread formed on the screw and a nut thread formed on the nut, the screw thread and nut thread having a helical pitch P. In a sectional plane containing the reference axis and passing through a center of a ball, any segment perpendicular to the reference axis, located at a distance x from the center of the first ball and having a first end which belongs to the screw thread and a second end which belongs to the nut thread, has a center which, in an orthonormal reference frame having an abscissa axis coincident with the reference axis and an ordinate axis passing through the center of the first ball.

14 Claims, 2 Drawing Sheets

BALL SCREW MECHANISM WITH ASYMMETRICAL ANGULAR THREADS

CROSS-REFERENCE TO RELATED APPLICATIONS

This application claims priority under 35 U.S.C. 119 to French Patent Application No. 2401384, filed Feb. 13, 2024; this disclosure of which is incorporated herein by reference in its entirety.

FIELD

The invention relates to the field of ball screws, and more specifically to the threads of such a screw mechanism.

BACKGROUND

Document DE102007017214 discloses a ball screw mechanism, comprising a screw defining a reference axis, a nut and at least two balls rolling on a screw thread formed on the screw and a nut thread formed on the nut. This mechanism features threads whose flanks have different radii of curvature. When the mechanism is loaded with low-amplitude forces in a given axial direction corresponding to normal operation, the balls are in contact with a flank of large radius of curvature of the screw thread and with a flank of large radius of curvature of the nut thread, in order to minimize friction. When the mechanism at rest is axially loaded in a direction opposite to the normal operating direction, the balls come to bear against a flank with a small radius of curvature of the screw thread and a flank with a small radius of curvature of the nut thread, so as to be able to take up large-amplitude static forces, at the cost of greater friction. However, this mechanism is not suitable for an application in which the forces exerted on the moving mechanism have a high amplitude and a constant axial direction, irrespective of the direction of rotation of the mechanism.

SUMMARY

The aim of the invention is to remedy the disadvantages of the state of the art and to offer a ball screw mechanism that can rotate without excessive friction in both directions of rotation, while being subjected to high amplitude axial forces that are always applied in the same axial direction.

According to a first aspect of the invention, a ball screw mechanism is proposed, comprising a screw defining a reference axis, a nut and at least two balls of radius R positioned so as to roll on a screw thread formed on the screw and a nut thread formed on the nut, the screw thread and the nut thread having, in an active portion of the screw and the nut, a helical pitch P, characterized in that in a sectional plane containing the reference axis and passing through a center of a first ball of the at least two balls, the first ball being positioned in the active portion of the screw and nut, any segment perpendicular to the reference axis, located at a distance x from the center of the first ball, and having a first end which belongs to the screw thread and a second end which belongs to the nut thread, has a center which, in an orthonormal reference frame having an abscissa axis coincident with the reference axis and an ordinate axis passing through the center of the first ball, has an abscissa equal to x and an ordinate y, defining a function x→y=$f(x)$ which, when x varies between 0 and P, passes through a minimum Y0 reached for an abscissa X0 and through a maximum Y1 reached for an abscissa X1, such that the following inequalities are respected:

$$\begin{cases} \frac{9}{10}R < X0 < P - \frac{9}{10}R \\ \frac{9}{10}R < X1 < P - \frac{9}{10}R \\ Y1 - Y0 > 0,10\,\text{mm} \end{cases}$$

Furthermore, any segment perpendicular to the reference axis, located at a distance x from the center of the first ball, and having a first end which belongs to the screw thread and a second end which belongs to the nut thread, has a length L defining a function x→L=$g(x)$ which, when the abscissa x of the center of the segment varies between 0 and the helical pitch P, is always greater than 0.25 mm, and preferably greater than 0.40 mm.

The screw thread is radially protruding in the area near the maximum abscissa X1, and depressed in the area near the minimum abscissa X0. Conversely, the nut thread is radially protruding in the area near the minimum abscissa X0, and depressed in an area near the maximum abscissa X1. This means that when a force is applied to the nut in a preferred axial force direction from X1 to X0, there is a large contact area between the balls and the threads of the screw and nut, giving the mechanism a high capacity. In the opposite axial direction, the contact areas available are smaller, which is not a disadvantage insofar as the expected forces remain low. The minimum distance L between the screw thread and the nut thread ensures good lubrication of the mechanism. It also prevents any contact between screw and nut, even under high loads and deformations.

Preferably:

$$Y1 - Y0 > 0.20\,\text{mm}$$

According to one embodiment:
- the screw thread forms a helical inner raceway facing radially away from the reference axis and delimited by two opposite flanks of the screw thread located on either side of a bottom of the screw thread,
- the nut thread forms a helical outer raceway facing radially towards the reference axis and delimited by two opposing nut thread flanks located on either side of a bottom of the nut thread,
- one of the two extended flanks of the nut thread is extended towards the reference axis with respect to the other of the two flanks of the nut thread,
- one extended flank of the two screw thread flanks is extended in a radial direction opposite to the reference axis with respect to the other of the two screw thread flanks, and
- the extended flank of the nut thread lies radially facing the other flank of the screw thread and the extended flank of the screw thread lies radially facing the other flank of the nut thread, the extended flank of the nut thread and the extended flank of the screw thread facing one another axially.

In a preferred axial direction of force corresponding to contact between the balls and the extended flanks of the screw thread and nut thread, the contact ellipse can extend over a larger surface area of the extended flanks of both threads, including in areas corresponding to the flank extensions. This asymmetry increases the capacity of the mechanism in this direction, while preserving sufficient space between the screw and the nut, in the area between two successive turns, for good lubrication of the mechanism. The asymmetry of the flanks means that the available surface area of the non-extended flanks is less in order to form the contact interface with the balls, resulting in a lower capacity of the mechanism in the direction of forces opposite to the preferred direction. This is not a problem, however, since in the application envisaged, the forces in this direction are low, or even zero.

Preferably, both flanks of the screw thread have, in a section plane perpendicular to the bottom of the screw thread, a radius of curvature at any point greater than the radius R of the balls. Similarly, the two flanks of the nut thread preferably have, in a section plane perpendicular to the bottom of the nut thread, a radius of curvature at any point greater than the radius R of the balls. This ensures good control of the point contact interface between the balls and the flanks of the screw thread and nut thread.

Preferably, both flanks of the screw thread have an arcuate curvature in a cutting plane perpendicular to the bottom of the screw thread, and both flanks of the nut thread have an arcuate curvature in a cutting plane perpendicular to the bottom of the nut thread. Preferably, one or more of the following arrangements are created:
- both flanks of the screw thread have an identical radius of curvature; and/or
- both flanks of the nut thread have an identical radius of curvature; and/or
- at least one of the two flanks of the screw thread has an identical radius of curvature as at least one of the two flanks of the nut thread.

In this way, the coefficient of friction between balls and raceways is independent of the direction in which the axial force is applied (in the preferred direction or the opposite direction), for a given amplitude of the resultant axial force.

According to one embodiment, the values X0 and X1 satisfy the following inequalities:

$$\begin{cases} R < X0 < P - R \\ et \\ R < X1 < P - R \end{cases}$$

According to one embodiment, the two extremes satisfy the following double inequality, where D is the distance D between the center of the first ball and the reference axis:

$Y0 < D < Y1$

According to one embodiment, $D-Y0-\varepsilon < Y1-D < D-Y0+\varepsilon$ where $\varepsilon$ denotes a margin of distortion such that $0 < \varepsilon < 0.05$ mm.

According to one embodiment, the function the function $x \to y = f(x)$ is such that, for any z value between 0 and P/2–R, where R is the radius of the at least two balls, we observe:

$$\begin{cases} 2f\left(\frac{P}{2}\right) - \varepsilon 1 < f\left(\frac{P}{2} + z\right) + f\left(\frac{P}{2} - z\right) < 2f\left(\frac{P}{2}\right) + \varepsilon 1 \\ \text{with } \varepsilon 1 < 0.05 \text{ mm} \end{cases}$$

These inequalities reflect an approximate symmetry of the function $x \to y = f(x)$, with a margin of distortion $\varepsilon 1$, around and close to a center of symmetry at abscissa P/2.

According to one embodiment:

$$D - \varepsilon 1 < f\left(\frac{P}{2}\right) < D + \varepsilon 1$$

According to one embodiment:

$$\frac{X0 + X1}{2} = \frac{P}{2}$$

According to one embodiment, the function $x \to y = f(x)$ is continuous.

According to one embodiment, the function $x \to y = f(x)$ is strictly increasing or strictly decreasing between X0 and X1.

Near the center of the balls, the function $x \to y = f(x)$ is relatively constant. Thus, with D designating the distance between the center of the first ball and the reference axis, and $\varepsilon$ designating a margin of distortion such that $0 < \varepsilon < 0.05$ mm, we observe:

$$\text{for } 0 < x < \frac{9R}{10}, D - \varepsilon < f(x) < D + \varepsilon$$

$$\text{for } P - \frac{9R}{10} < x < P, D - \varepsilon < f(x) < D + \varepsilon$$

BRIEF DESCRIPTION OF THE FIGURES

Other features and advantages of the invention will become apparent on reading the following description, with reference to the appended figures, which show.

For greater clarity, identical or similar elements are identified by identical reference signs in all of the Figures.

DETAILED DESCRIPTION

Figure 1:
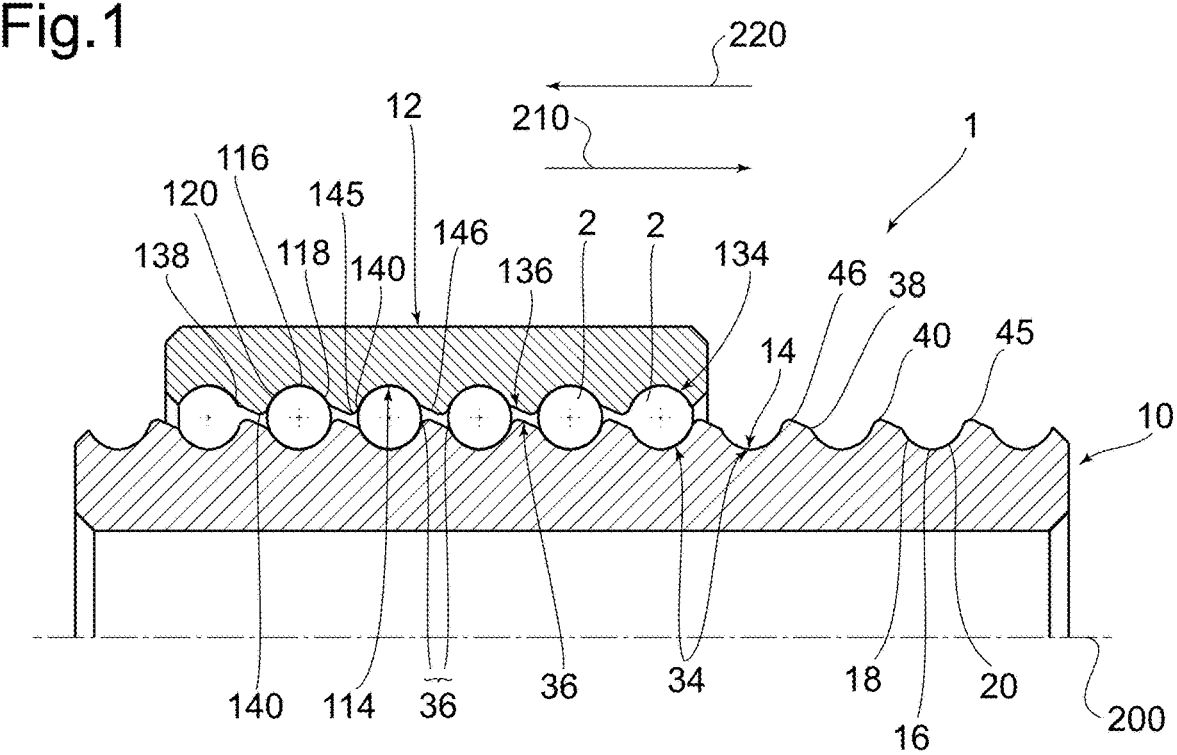
FIG. 1 shows a ball screw mechanism, in axial section, showing in particular balls circulating on raceways of a nut and a screw of the ball-screw mechanism.

FIG. 1 shows a ball screw mechanism 1 comprising two threaded components, namely a screw 10 and a nut 12, and balls 2. The screw 10 is preferably metal, for example steel, and has a screw thread 34 which forms an inner helical raceway 14 around a reference axis 200 of the ball screw mechanism 1 defined by the screw 10, the inner helical raceway 14 facing radially away from the reference axis 200. The nut 12 is preferably metallic, for example steel, and has a nut thread 134 which forms an outer helical raceway 114 around the reference axis 200, and facing radially towards the reference axis 200. One of the two threaded components, screw 10 or nut 12, also forms a recirculation channel, not shown in the figures, which preferably spans several turns of the raceways 14, 114 of screw 10 and nut 12. The balls 2 can be made of steel or ceramic, for example, and are sized and positioned to circulate in a closed circuit between the outer helical raceway 114 of the nut 12 and the inner helical raceway 14 of the screw 10, as well as in the recirculation channel, preferably without separators between the balls 2.

The inner helical raceway 14 of the screw 10 has, on at least an active portion, a helical envelope of constant pitch P around the reference axis 200, with a raceway bottom 16, as well as a first flank 18 and a second flank 20 facing one another on either side of the raceway bottom 16, the first flank 18 facing in a first axial direction 210 of the reference axis 200, the second flank 20 facing in a second axial direction 220 of the reference axis 200.

Figure 2:
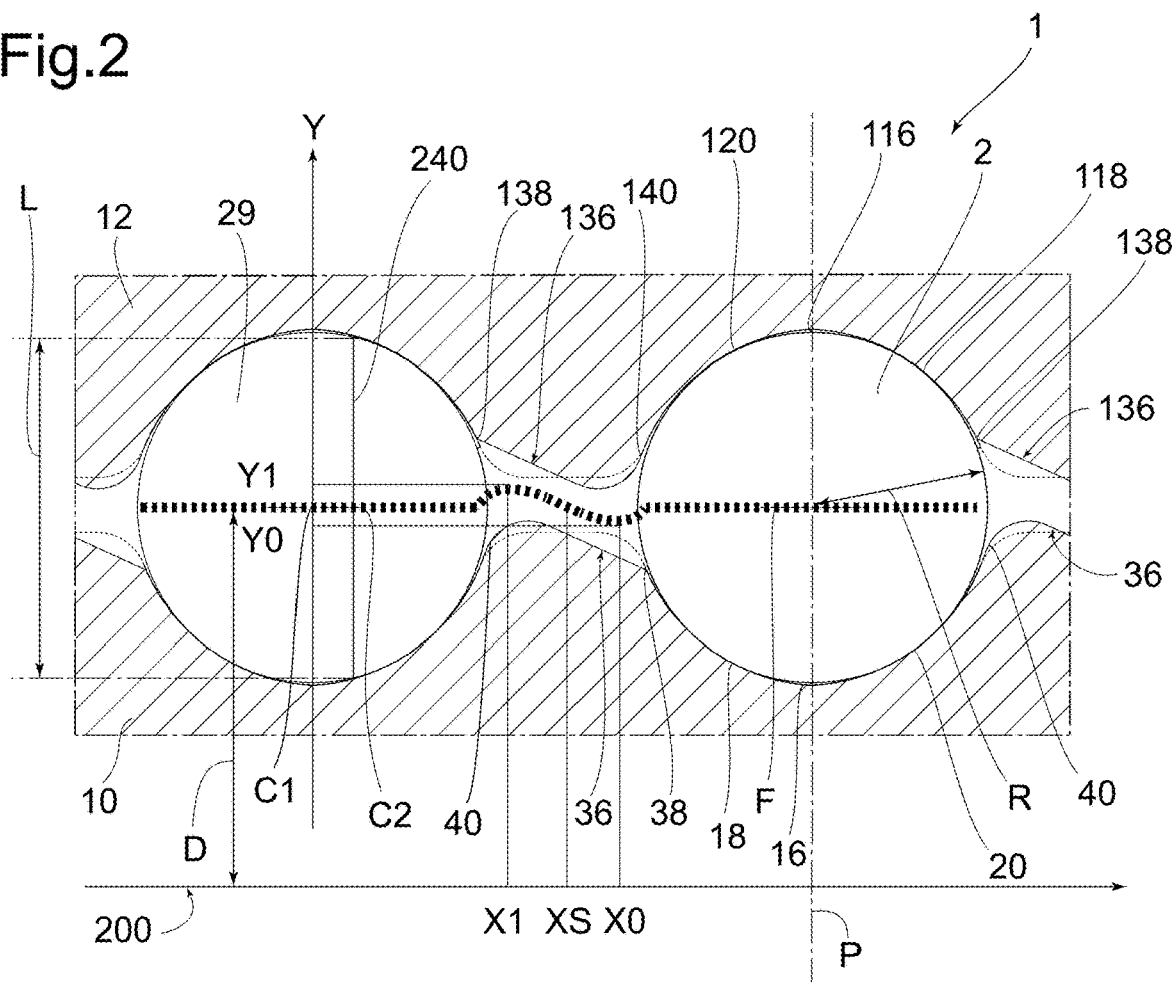
FIG. 2 shows a detailed view of a nut thread and a ball screw thread.

In the following description, we refer to FIGS. 1 and 2, where the ball screw mechanism 1 is shown in cross-section. The section shown in FIG. 2 is taken in a cutting plane containing reference axis 200 and passing through a center of one of the balls.

The flanks 18, 20 of the helical raceway 14 of the screw 10 preferably have a concave cross-section, in any plane containing the reference axis 200. These concave cross-sections have a non-constant radius of curvature in the plane shown in FIG. 2. However, when viewed in any cross-sectional plane perpendicular to a tangent to the raceway bottom 16, that is, in a plane inclined by the value of the helix angle relative to the plane shown in FIG. 2, the flanks 18, 20 are preferably arcuate, and preferably with equal radii of curvature for both flanks, so as to form an ogive extending on either side of the raceway bottom 16, or a continuous arc of a circle. However, the helix angle is sufficiently small that, in the cross-sectional plane of FIG. 2, variations in the radius of curvature and center of curvature of flanks 18, 20 are small, for example less than 0.1 mm.

The first flank 18 has an end 38 opposite the raceway bottom 16. The second flank 20 has an end 40 opposite the raceway bottom 16.

The end 38 of the first flank 18 of the screw 10 is radially less distant from the reference axis 200 than the end 40 of the second flank 20 of the screw 10.

The helical raceway 14 of the screw 10 comprises several successive turns separated by connecting portions 36 protruding from the screw thread 34. Each connecting portion 36 joins the ends 38, 40 of the flanks 18, 20 of the screw 10. The connecting portion 36 forms a rectilinear curve 46 in the vicinity of the end 38 of the first flank 18 of the raceway 14 of the screw 10, the end 38 constituting an inflection point with two half-tangents forming an obtuse angle between them. The connecting portion 36 has a convex curvature 45 in the vicinity of the end 40 of the second flank 20 of the raceway 14 of the screw 10, this end 40 constituting an inflection point, the surface of the screw thread 34 crossing its tangent at this inflection point 40.

The outer helical raceway 114 of nut 12 has, on at least one active portion, a helical envelope of constant pitch P around reference axis 200, with a raceway bottom 116, as well as a first flank 118 and a second flank 120 facing one another on either side of raceway bottom 116, the first flank 118 being turned in the second axial direction 220 of reference axis 200, axially opposite the first flank 18 of the raceway 14 of the screw 10 and radially facing the second flank 20 of the raceway 14 of the screw 10, the second flank 120 being turned in a first axial direction 210 of the reference axis 200, axially opposite the second flank 20 of the raceway 14 of the screw 10 and radially facing the first flank 18 of the raceway 14 of the screw 10.

The flanks 118, 120 of the helical raceway 114 of nut 12 preferably have a concave cross-section in any plane containing reference axis 200. These concave cross-sections have a non-constant radius of curvature in the plane shown in FIG. 2. However, when viewed in any cross-sectional plane perpendicular to a tangent to the raceway bottom 116, that is, in a plane inclined by the value of the helix angle with respect to the plane shown in FIG. 2, the flanks 118, 120 are preferably arcuate, and preferably with equal radii of curvature for both flanks, so as to form an ogive extending on either side of the raceway bottom 116, or a continuous arc of a circle. However, the helix angle is small enough that, in the cross-sectional plane of FIG. 2, variations in the radius of curvature and center of curvature of the flanks 118, 120 are small, for example less than 0.1 mm.

The first flank 118 has an end 138 opposite the raceway bottom 116. The second flank 120 has an end 140 opposite the raceway bottom 116. The end 138 of the first flank 118 of the nut 12 is radially further from the reference axis 200 than the end 140 of the second flank 120 of the nut 12. The helical raceway 114 of nut 12 comprises several successive turns separated by projecting connecting portions 136 of nut thread 134. Each connecting portion 136 joins the ends 138, 140 of the flanks 118, 120 of the nut 12. The connecting portion 136 forms a rectilinear curve 146 in the vicinity of the end 138 of the first flank 18 of the raceway 114 of the nut 12, the end 138 constituting an inflection point with two half-tangents forming an obtuse angle between them. The connecting portion 136 has a convex curvature 145 in the vicinity of the end 140 of the second flank 120 of the raceway 114 of the nut 12, this end 140 constituting an inflection point, the surface of the nut thread 134 crossing its tangent at this inflection point 140.

Thus, the second flank 120 of the nut thread 134 is extended towards the reference axis 200 with respect to the first flank 118 of the nut thread 134. Similarly, the second flank 20 of the screw thread 34 is extended in the radial direction opposite the reference axis 200 with respect to the first flank 18 of the screw thread 34. The extended flank 120 of the nut thread 134 lies radially facing the non-extended flank 18 of the screw thread 34 and, similarly, the extended flank 20 of the screw thread 34 lies radially facing the non-extended flank 118 of the nut thread 134. The extended flanks 120 and 20 face one another on either side of the ball center 2.

To describe the volume delimited by the screw thread 34 and the nut thread 134 in the plane of FIG. 1 and FIG. 2, an orthonormal reference frame R is defined, with an abscissa axis coincident with the reference axis 200 and an ordinate axis passing through the center C1 of the first ball 2a. Any imaginary segment 240 perpendicular to reference axis 200 can then be observed at a distance x from a center C1 of a first ball 2a, distance x varying from 0 to P, P being the value of the helical pitch of screw thread 34 and nut thread 134. The segment 240 has a first end belonging to the screw thread 34 and a second end belonging to the nut thread 134.

Figure 3:
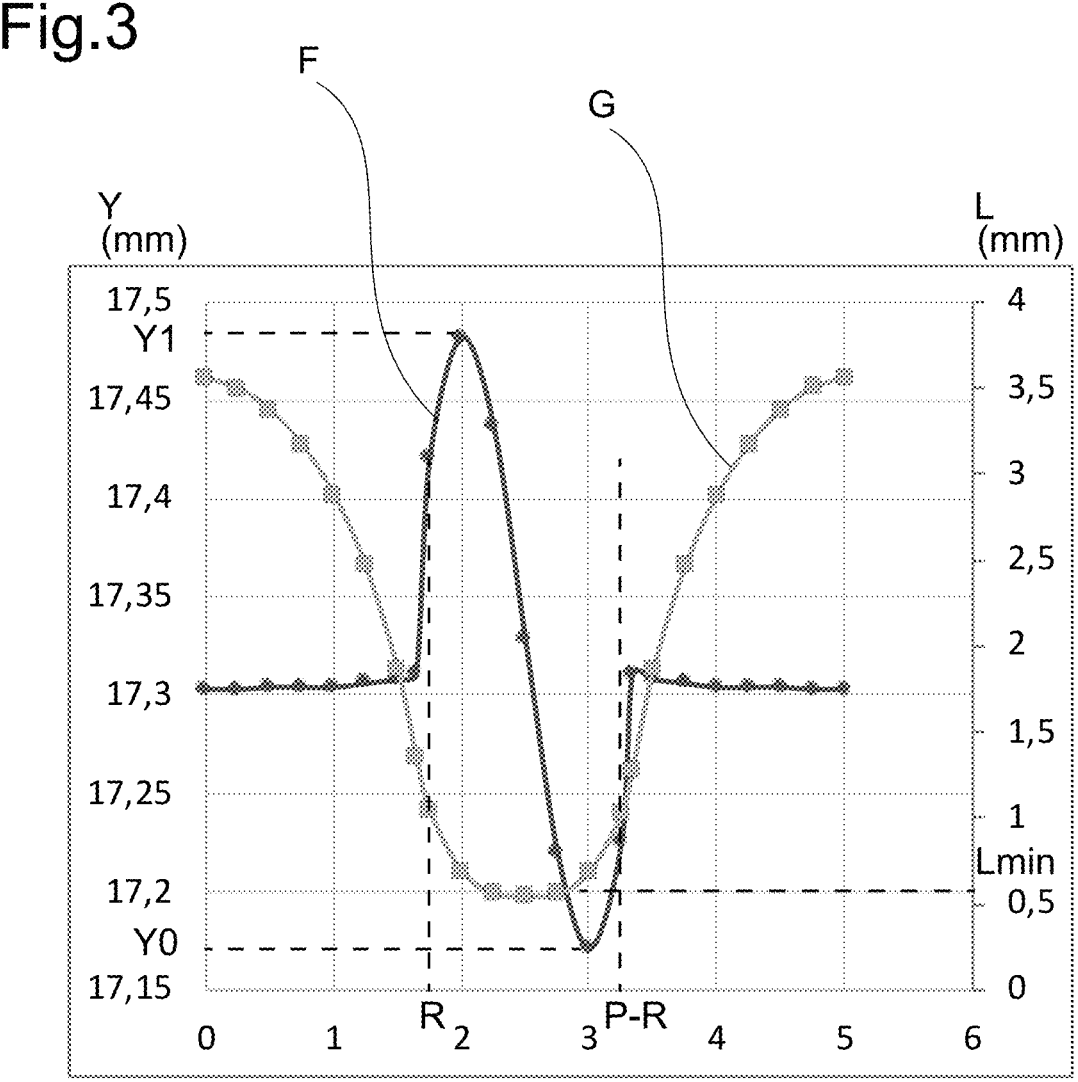
FIG. 3 depicts a curve showing the radial distance between the middle of an imaginary segment separating the two threads of the ball screw mechanism and a reference axis, as well as a curve showing the evolution of the length of said imaginary segment as a function of the axial distance to the center of a ball in the mechanism.

Segment 240 has a center C2 with coordinates x as abscissa and y as ordinate, defining a function $x \rightarrow y = f(x)$ whose curve F is shown schematically superimposed on FIG. 3, and with reference to the left-hand scale on the graph in FIG. 3, the abscissa axis being graduated in units each corresponding to one fifth of P. The numerical values proposed are purely illustrative. In practice, The function $x \rightarrow y = f(x)$ passes through a minimum Y0 reached for an abscissa X0 and a maximum Y1 reached for an abscissa X1, where values X0 and X1 are each greater than the radius of balls 2. The function $x \rightarrow y = f(x)$ is continuously increasing or continuously decreasing between X0 and X1, and is more generally continuous over the entire length of screw 10.

Inside the raceways 14, 114, the center of segment 240 remains at a distance from the reference axis that is close to the value D, which can be expressed in terms of a ε designating a margin of distortion such as 0<ε<0.05 mm, by:

$$\text{for } 0 < x < \frac{9R}{10}, D - \varepsilon < f(x) < D + \varepsilon$$

$$\text{for } P - \frac{9R}{10} < x < P, D - \varepsilon < f(x) < D + \varepsilon$$

The center C1 of the first ball 2a is distant from the reference axis 200 by a distance D corresponding to half the pitch diameter of the mechanism. Minimum Y0 is less than distance D, while Y1 is greater than distance D. The minimum Y0 is reached for an abscissa X0 such that $$R < X0 < P - R$$

The maximum Y1 is reached for an abscissa X1 such that:

$$R < X1 < P - R$$

The ball screw mechanism 1 is preferably approximately symmetrical in the cross-sectional plane of FIGS. 1 and 2, such that $$D - Y0 - \varepsilon < Y1 - D < D - Y0 + \varepsilon;$$

ε denoting a margin of distortion such that 0<ε<0.05 mm.

More generally, the central symmetry of the ball mechanism 1 at the center of symmetry at the abscissa XS=(X1+X0)/2 or XS=P/2, and at the ordinate YS=D, can be written as follows $$2f\left(\frac{P}{2}\right) - \varepsilon 1 < f\left(\frac{P}{2} + z\right) + f\left(\frac{P}{2} - z\right) < 2f\left(\frac{P}{2}\right) + \varepsilon 1$$

ε1 designating a margin of distortion such that 0<ε1<0.05 mm.

In these inequalities, ε and ε1 account for the inclination of the helical threads with respect to the axial sectional plane of FIGS. 1 and 2, and therefore for the helix angle and the pitch diameter 2D of the mechanism.

The margins of distortion ε and ε1 are related to the inclination of the helical threads with respect to the axial cutting plane of FIGS. 1 and 2, and are a function of the helix angle and the pitch diameter 2D of the mechanism. The values of ε and ε1 are less than D/10, and preferably less than D/50.

In practice, the difference Y1-Y0 is significant, and respects the following inequality:

$$Y1 - Y0 > 0.10 \text{ mm}$$

Preferably:

$$Y1 - Y0 > 0.20 \text{ mm}$$

Furthermore, the length L of segment 240 varies as a function of the abscissa x of segment 240, defining a function x→g(x)=L, whose curve G is shown on the graph in FIG. 3, with reference to the right-hand scale for ordinates. The function x→L=g(x), passes through a minimum value Lmin, which itself is greater than or equal to 0.25 mm, preferably greater than 0.40 mm, for example greater than 0.45 mm or 0.50 mm, on the one hand to guarantee satisfactory grease circulation between the raceway turns, and on the other hand to avoid shocks between the screw and nut threads under high loads and strong deformations, particularly in the zone corresponding to the connecting portions 36, 136 where this minimum value is eventually reached.

The axial direction 210 is a preferred direction for the forces applied by the nut 12 on the balls 2 and for the forces applied by the balls 2 and by the screw 10: when the nut applies a force to the balls 2, the resultant of which has an axial component in the axial direction 210, the contact ellipse between each ball 2 and the raceway 114 of the nut 12 is formed on the second flank 120, and may extend over a large area of the second flank, including in the zone corresponding to the extension of this second flank 120. Similarly, the contact ellipse between each ball 2 and the raceway 14 of the screw 10 is formed on the second flank 20, and may extend over a substantial surface of the second flank 20, including in the area corresponding to the extension of this second flank 20.

This asymmetry increases the capacity of the mechanism in this direction, while preserving sufficient space between the screw and the nut, in the area radially between the connecting portions 36, 136, for good lubrication of the mechanism.

The asymmetry of the flanks also means that less surface area is available at the non-extended flanks 18, 118 to form a contact interface with the balls, so that the capacity of the mechanism in the force direction 220 opposite to the preferred direction 210, is substantially lower than the capacity in the preferred direction 210, which is not a problem, however, since in the application envisaged, the axial forces are unidirectional or essentially unidirectional.

The invention claimed is:

1. A ball screw mechanism, comprising a screw defining a reference axis, a nut and at least two balls of radius R positioned to roll on a screw thread formed on the screw and a nut thread formed on the nut, the screw thread and nut thread having, in an active portion of the screw and nut, a helical pitch P, wherein in a sectional plane containing the reference axis and passing through a center of a first ball of the at least two balls, the first ball being positioned in the active portion of the screw and nut, any segment perpendicular to the reference axis, located at a distance x from the center of the first ball, and having a first end which belongs to the screw thread and a second end which belongs to the nut thread, has:

a center which, in an orthonormal reference frame having an abscissa axis coincident with the reference axis and an ordinate axis passing through the center of the first ball, has an abscissa equal to x and an ordinate y, defining a function x→y=f(x) which, when x varies between 0 and P, passes through a minimum Y0 reached for an abscissa X0 and through a maximum Y1 reached for an abscissa X1, such that the following inequalities are respected:

$$\begin{cases} \frac{9}{10}R < X0 < P - \frac{9}{10}R \\ \frac{9}{10}R < X1 < P - \frac{9}{10}R \\ Y1 - Y0 > 0.10 \text{ mm} \end{cases}$$

and a length L defining a function x→L=g (x) which, when the abscissa x of the center of the segment varies between 0 and the helical pitch P, is always greater than 0.25 mm.

2. The ball screw mechanism of claim 1, wherein the screw thread forms a helical inner raceway facing radially away from the reference axis and delimited by two opposite flanks of the screw thread located on either side of a bottom of the screw thread, the nut thread forms a helical outer raceway facing radially towards the reference axis and delimited by two opposite flanks of the nut thread located on either side of a bottom of the nut thread, one extended flank of the two flanks of the nut thread is extended towards the reference axis with respect to the other of the two flanks of the nut thread, one extended flank of the two flanks of the screw thread is extended in a radial direction opposite to the reference axis with respect to the other of the two flanks of the screw thread, the extended flank of the nut thread lies radially facing the other flank of the screw thread and the extended flank of the screw thread lies radially facing the other flank of the nut thread, the extended flank of the nut thread and the extended flank of the screw thread facing one another axially.

3. The ball screw mechanism of claim 2, wherein the two flanks of the screw thread have an arcuate curvature in a sectional plane perpendicular to a base of the screw thread and the two flanks of the nut thread have an arcuate curvature in a sectional plane perpendicular to the bottom of the nut thread.

4. The ball screw mechanism of claim 1, wherein D−Y0−ε<Y1−D<D−Y0+ε; D designating the distance between the center of the first ball and the reference axis, ε designating a margin of distortion such that 0<ε<0.05 mm.

5. The ball screw mechanism of claim 1, wherein the function x→y=ƒ(x) is such that, for any value z between 0 and P/2-R, where R is the radius of the at least two balls:

$$\left\{ 2f\left(\frac{P}{2}\right) - \varepsilon 1 < f\left(\frac{P}{2} + z\right) + f\left(\frac{P}{2} - z\right) < 2f\left(\frac{P}{2}\right) + \varepsilon 1 \right.$$
with ε1 < 0.05 mm 6. The ball screw mechanism of claim 1, wherein:

$$\frac{X0 + X1}{2} = \frac{P}{2}.$$

7. The ball screw mechanism of claim 1, wherein the function x→y=ƒ(x) is continuous.

8. The ball screw mechanism of claim 1, wherein the function x→y=ƒ(x) is strictly increasing or strictly decreasing between X0 and X1.

9. The ball screw mechanism of claim 1, wherein:

$$Y1 - Y0 > 0.20 \text{ mm}.$$

10. The ball screw mechanism of claim 1, wherein:

$$\text{for } 0 < x < \frac{9}{10}R, D - \varepsilon < f(x) < D + \varepsilon$$

$$\text{for } P - \frac{9}{10}R < x < P, D - \varepsilon < f(x) < D + \varepsilon$$

D is the distance between the center of the first ball and the reference axis, ε is a margin of distortion such that 0<ε<0.05 mm.

11. The ball screw mechanism of claim 3, wherein the two flanks of the screw thread have an identical radius of curvature.

12. The ball screw mechanism of claim 3, wherein the two flanks of the nut thread have an identical radius of curvature.

13. The ball screw mechanism of claim 3, wherein at least one of the two flanks of the screw thread has an identical radius of curvature as at least one of the two flanks of the nut thread.

14. The ball screw mechanism of claim 1, wherein the function x→L=g(x), when the abscissa x of the center of the segment varies between 0 and the helical pitch P, is always greater than 0.40 mm.

\* \* \* \* \*